United States Patent [19]

Belleville

[11] Patent Number: 4,919,559

[45] Date of Patent: Apr. 24, 1990

[54] LOCKING ASSEMBLY

[75] Inventor: Ernest L. Belleville, Barrington, N.H.

[73] Assignee: Davidson Textron Inc., Dover, N.H.

[21] Appl. No.: 293,763

[22] Filed: Jan. 5, 1989

[51] Int. Cl.$^5$ .......................... B25G 3/14; F16D 1/10
[52] U.S. Cl. ...................................... 403/13; 403/106; 403/326; 403/361
[58] Field of Search ............... 403/361, 383, 244, 253, 403/266, 292, 298, 326, 104, 106, 13

[56] References Cited

U.S. PATENT DOCUMENTS

| | | | |
|---|---|---|---|
| 3,167,336 | 1/1965 | Lewis | 403/334 |
| 3,184,270 | 5/1965 | Ruhala | 403/383 X |
| 3,730,109 | 5/1973 | Kreizel et al. | 403/361 X |
| 4,096,587 | 10/1981 | Berdan | 403/298 X |

FOREIGN PATENT DOCUMENTS

| | | | |
|---|---|---|---|
| 549048 | 11/1942 | United Kingdom | 403/383 |
| 1535032 | 12/1978 | United Kingdom | 403/361 |

Primary Examiner—Andrew V. Kundrat
Assistant Examiner—Arlen L. Olsen
Attorney, Agent, or Firm—John C. Evans

[57] ABSTRACT

A locking assembly (10) having a female member (12) and a male member (22) particularly suited for use in an automotive arm rest. The female member (12) has a receiving cavity (14) with opposing and spaced walls (16a, 16b) extending along a receiving axis (18). The female member defines a plurality of locking recesses (20) spaced along the axis (18) on one wall (16a) of the cavity (14). The male member (22) has a plurality of tines (24) spaced apart longitudinally therealong for snapping into the recesses (20) to retain the male member (22) in the cavity (14). The assembly (10) is characterized by the female member (12) presenting a plurality of biasing beams (26) independent from one another and spaced along the opposite wall (16b) of the cavity (14) for respectively engaging the tines (24) to retain one tine (24) in each of the recesses (20).

14 Claims, 3 Drawing Sheets

LOCKING ASSEMBLY

TECHNICAL FIELD

This invention relates to an assembly for locking parts together.

BACKGROUND ART

It is desirable to efficiently lock parts together with a minimum of effort. The fewer the number of steps involved, the quicker assembly can be accomplished.

There are several existing systems for locking parts together. One system is shown in U.S. Pat. No. 3,167,336 to E. F. Lewis issued Jan. 26, 1965. In this patent a pair of barbs are used to wedge a male member in a female member. The barbs precede a recess that aids the wedging process. Because the barbs bend into their associated recess, it is externally difficult to remove the male member from the female member.

Another such assembly is disclosed in U.S. Pat. No. 3,730,109 to Kreizel et al issued May 1, 1973. In this assembly a leg is locked to a table by sliding a spline in a complimentary tapered recess. Once in place one end of the spline rests against a shoulder in the recess.

The '336 patent depends upon wedging action rather than locking action to connect the male member to the female members. The wedged connection can be separated if enough separation force is applied to the male member. The action is dependent on deflection of the barbs to wedge the male member into the female member and to separate the male member from the female member.

The '109 patent shows engagement of splines in a complimentary recess without discussing how the connection is accomplished.

SUMMARY OF THE INVENTION AND ADVANTAGES

There is provided a locking assembly comprising a female member and a male member which when joined are locked together rather than being wedge connected. The female member has a receiving cavity with opposing and spaced walls extending along a receiving axis. The female member defines a plurality of locking recesses spaced along the receiving axis on one wall of the cavity. The male member has a plurality of tines longitudinally spaced apart for snapping into the recesses of the female member, retaining the male member in the cavity. The assembly is characterized by the female member presenting a plurality of biasing means, independent from one another and spaced along the opposite wall of the cavity for respectively engaging the tines to retain each tine locked in one of each of the recesses.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
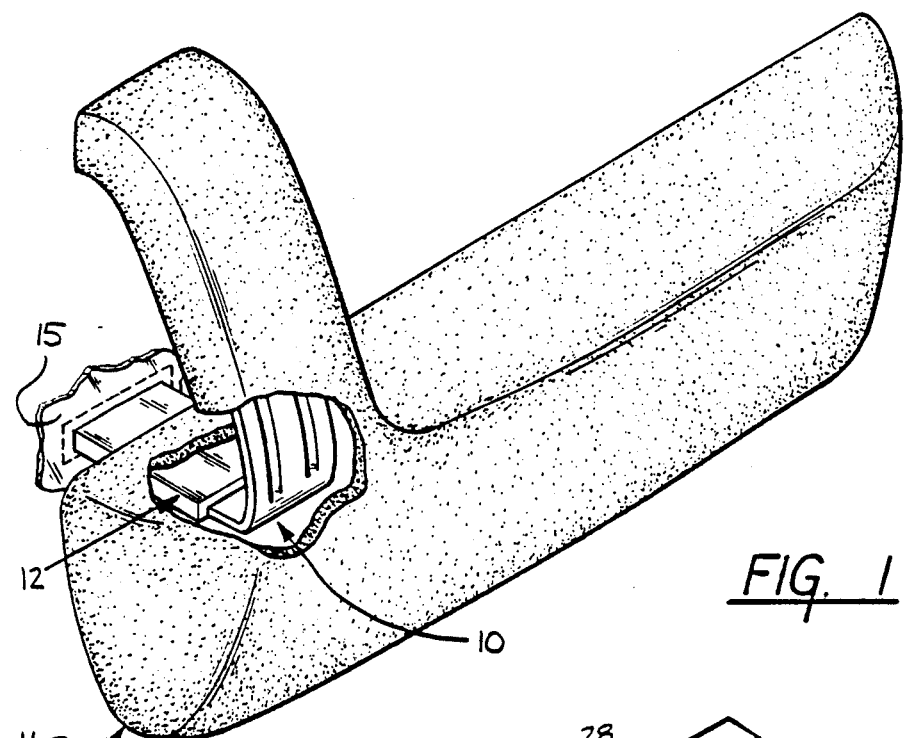
FIG. 1 is a perspective view of an armrest for an automobile that employs the instant invention.
Figure 2:
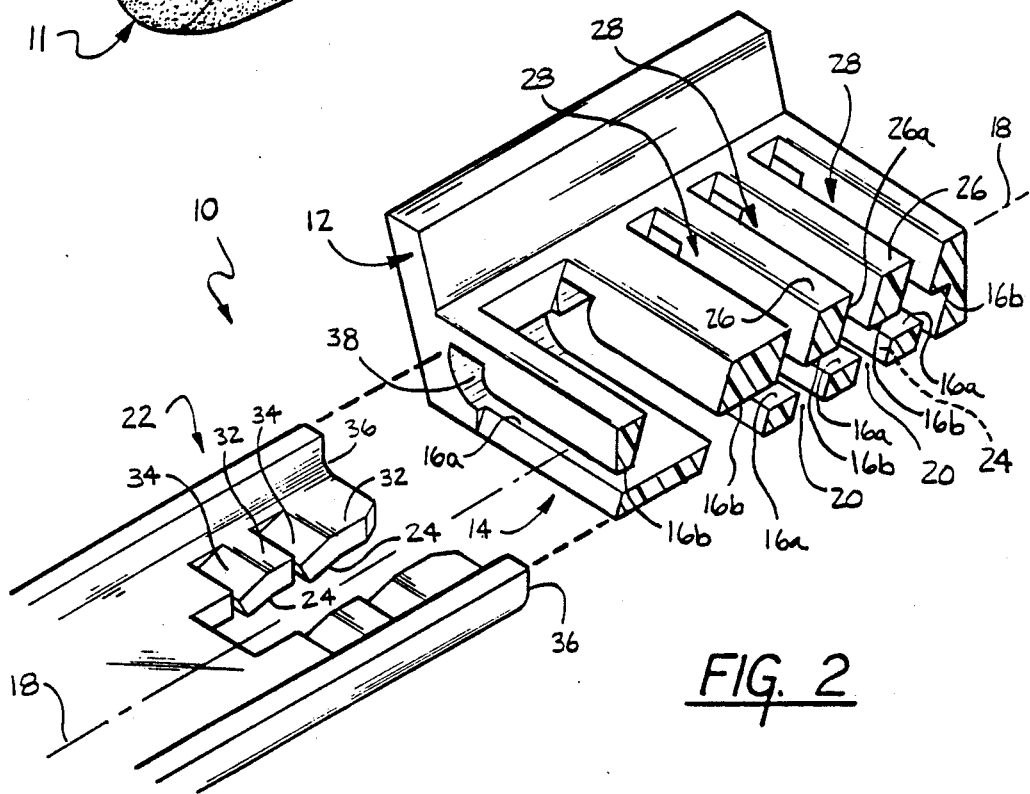
FIG. 2 is a perspective, fragmentary view of one embodiment of the invention shown in an unlocked position.

A locking assembly for locking together two parts is generally shown at 10. FIG. 1 shows the assembly 10 employed to mount an automotive arm rest 11 on a door 15.

The assembly 10 includes a female member 12 having a receiving cavity 14 and spaced walls 16a, 16b along a receiving axis 18. The female member 12 also has a plurality of locking recesses 20 spaced along the axis 18 on wall 16a of the cavity 14. The locking recesses 20 and walls 16a, 16b are spaced to be located in interlocked relationship with a male member 22.

The male member 22 has a plurality of tines 24 that are longitudinally spaced apart for snapping into the locking recesses 20 to retain the male member 22 in the receiving cavity 14. The number of tines 24 and locking recesses 20 may vary depending upon the use to which the locking assembly 10 is to be applied. The tines 24 must match the spacing of the spaced walls 16a, 16b of the female member 12. The configuration of the tines 24 must be such as to be engageable with the female member 12.

The assembly 10 is characterized by the female member 12 presenting a plurality of biasing means 26 to apply independent pressure points spaced along the wall 16b of the cavity 14 for respectively engaging each of the tines 24 to retain one tine 24 in locked position in each of the recesses 20.

Figure 3:
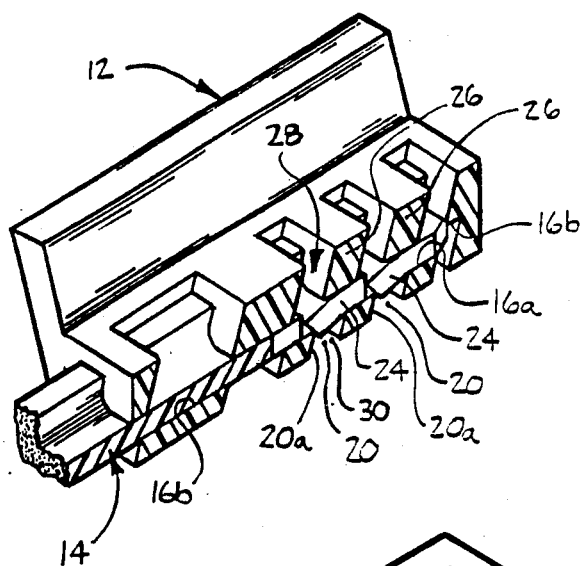
FIG. 3 is a cross-sectional view of the invention shown in FIG. 2A taken along line 3—3 in FIG. 2A looking in the direction of the arrows.

In the preferred embodiment the biasing means is shown in FIG. 3 as a plurality of separate cross beams 26. The female member 12 includes top openings 28 into the cavity 14 between the cross beams 26. The female member 12 is further characterized by having bottom openings 30 into the cavity 14 to define the recesses 20. While the preferred embodiment shows recesses 20 with bottom openings 30 it should be understood that the invention also contemplates the use of recesses without bottom openings.

The tines 24 are curved in a direction away from the receiving axis 14. Each tine 24 has a first segment 32 that is parallel to the receiving axis 14 and a second segment 34 that is curved away from the receiving axis 14. A coacting guide means 36 guides the male member 22 into the cavity 14 of the female member 12. The guide means 36 comprise tracks on the male member 22 coacting with a complimentary portion 38 on the female member 12. Complementary, as used here, means having a configuration enabling a coactive engagement between the male and female members.

The biasing beams 26 prevent the tines 24 from escaping their locked position in the recesses 20 upon reverse movement of the male member 24 in the direction of the inboard surfaces 20a of female member 24 defining the recess 20.

The biasing beams 26 are further characterized by being flexible. The flexibility allows the biasing beams 26 to deflect upwardly as the male member 22 is inserted into the cavity 14. The biasing beams 26 are disposed opposite each one of the cavities 20 along the receiving axis 18. The biasing beams 26 are more flexible than the tines 24 and will yield to reduce the force required to lock the male member 22 in the female member 12. Once the tines 24 are locked in the recesses 20 separation only can occur by combining a lift force to raise the biasing beams 26 while supplying a separation force. Otherwise, the female member 12 and male member 22 are retained in a securely biased locked relationship.

The male member 22 may be a polymeric organic material or metal. The female member 12 may be a polymeric organic material or metal.

Figure 4:
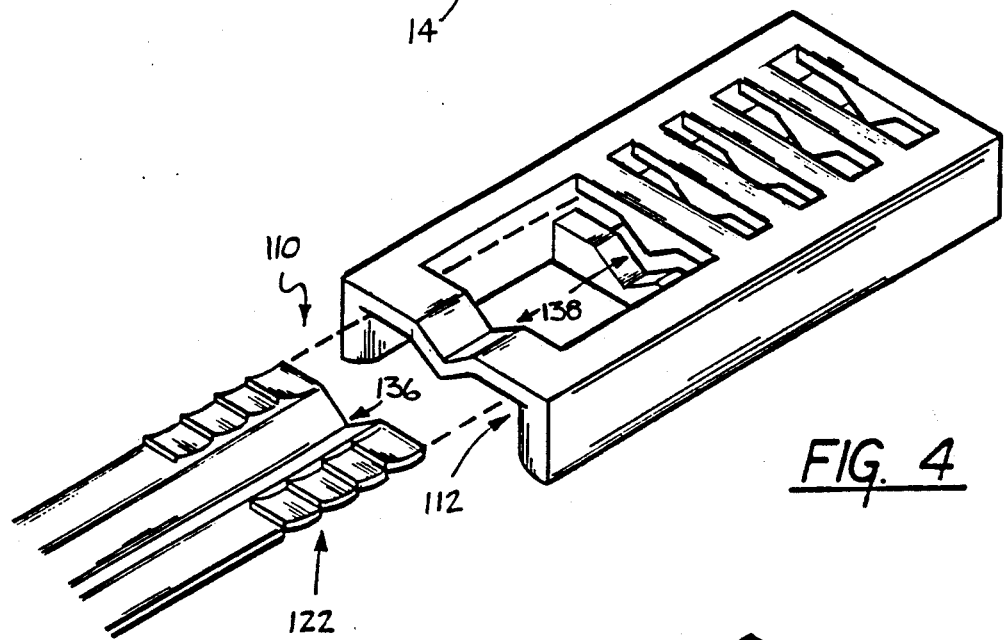
FIG. 4 is a perspective view of another embodiment of the invention shown in an unlocked position.
Figure 5:
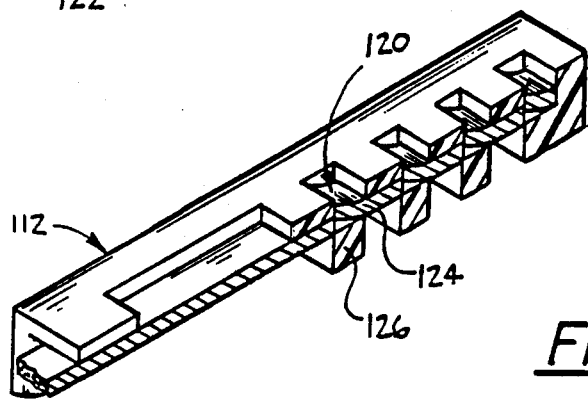
FIG. 5 is a cross-sectional view taken along line 5—5 of FIG. 4A in the direction of the arrows.
Figure 2A:
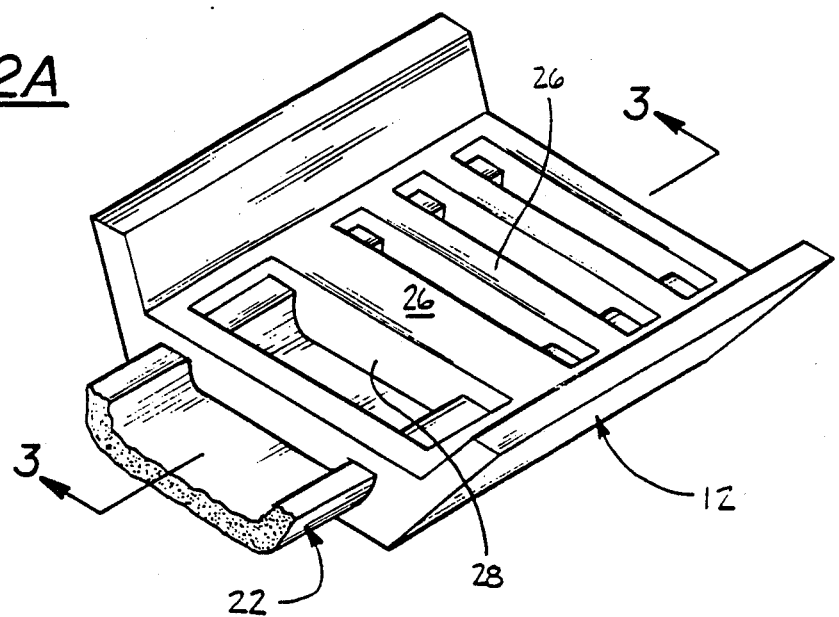
FIG. 2A is a view like FIG. 2 showing the invention in a locked position.
Figure 4A:
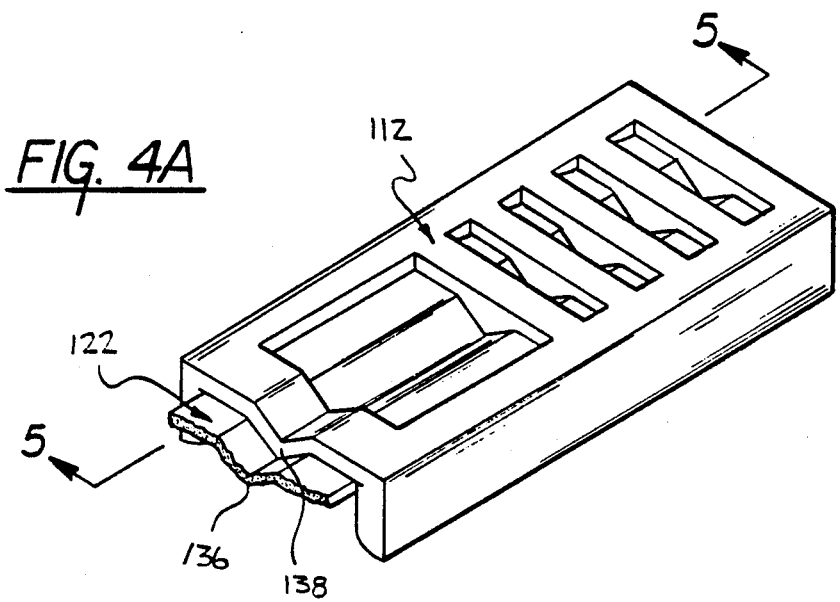
FIG. 4A is a view like FIG. 4 showing the invention in a locked position.

A second embodiment of a locking assembly for locking together two parts, shown in FIGS. 4 and 5, is shown at 110. In this embodiment the guide means 136 comprises a centrally located arch on the male member 122 coacting with a complementary portion 138 on the female member 112. As best seen in FIG. 5, tines 124 on the male member 122 are held by biasing beams 126 in locking recesses 120 of female member 112. Beam deflection on insertion is the same as described with reference to the first embodiment. Separation requires applying a simultaneous downward force on beams 126 and a longitudinal release force on male member 122. Otherwise, the male member and female members are held in a secure biased locked relationship.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A locking assembly (10) comprising;
   a female member (12) having a receiving cavity (14) formed by first and second spaced walls (16a, 16b) extending along a receiving axis (18),
   said female member defining a plurality of locking recesses (20) spaced along said axis on said first spaced wall (16a) of said cavity (14),
   a male member (22) having a plurality of tines (24) spaced apart longitudinally therealong for snapping into said recesses (20) to retain said male member (22) in said cavity (14),
   said assembly (10) characterized by said female member (12) having a plurality of biasing means (26) independent from one another and axially spaced from each other along said second spaced wall of said cavity (14) and separated by spaced openings through said second spaced wall for locating each of said biasing means to respectively engage only one of said tines (24) when the male member is fully inserted to retain each tine (24) locked in one of said recesses (20).

2. An assembly as set forth in claim 1 further characterized by said biasing means (26) being flexible to selectively engage and release each tine directed thereacross as the male member is inserted into the female member; for allowing said male member (22) to be inserted into said cavity (14) and for retaining each of said tines (24) in interlocked relationship with each of said locking recesses (20) when the male member is fully received in the female member.

3. An assembly as set forth in claim 2 further characterized by said biasing means (26) being more flexible than said tines (24).

4. An assembly as set forth in claim 3 further characterized by each of said biasing means (26) being disposed opposite one of said recesses (20) along said axis (14).

5. An assembly as set forth in claim 1 further characterized by said biasing means (26) being cross beams perpendicular to the receiving axis.

6. An assembly as set forth in claim 5 further characterized by said male member (22) being made of metal and said female member (12) being made of polymeric organic material.

7. An assembly as set forth in claim 6 further characterized by said female member (12) having bottom openings (30) into said cavity (14) to define said recesses (20).

8. An assembly as set forth in claim 7 further characterized by said tines (24) being curved away from said receiving axis (18).

9. An assembly as set forth in claim 8 further characterized by each tine (24) having a first segment (32) parallel to said receiving axis (18) and a second segment (34) curved away from said receiving axis (18).

10. An assembly as set forth in claim 9 further characterized by said coacting guide means (136) being an arch on the male member (122) coacting with a complementary portion (138) on the female member (112).

11. An assembly as set forth in claim 9 further characterized by said coacting guide means (36) being tracks on the male member (22) coacting with a complementary portion (38) on the female member (12).

12. An assembly as set forth in claim 9 further characterized by said female member (12) having bottom openings (30) into said cavity (14) to define said recesses (20).

13. An assembly as set forth in claim 9 further characterized by said tines (24) being curved away from said receiving axis (18).

14. An assembly as set forth in any one of claims 1 and 2 further characterized by including coacting guide means (36) for guiding said male member (22) into said cavity (14) of said female member (12).

* * * * *